(12) United States Patent
Chuang et al.

(10) Patent No.: US 10,365,751 B2
(45) Date of Patent: Jul. 30, 2019

(54) DISPLAY DEVICE WITH THREE-DIMENSION INPUT MODULE

(71) Applicant: TPK Touch Solutions (Xiamen) Inc., Xiamen (CN)

(72) Inventors: Chih-Cheng Chuang, Hsinchu (TW); Tai-Shih Cheng, Taipei (TW); Xiaoxian He, Zhangzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 122 days.

(21) Appl. No.: 15/206,310

(22) Filed: Jul. 10, 2016

(65) Prior Publication Data

US 2017/0010740 A1  Jan. 12, 2017

(30) Foreign Application Priority Data

Jul. 10, 2015  (CN) .......................... 2015 1 0404595
Sep. 11, 2015  (CN) .......................... 2015 1 0577932

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ...... G06F 3/041; G06F 3/0412; G06F 3/0414; G06F 3/0416; G06F 3/044; G06F 2203/04101; G06F 2203/04102; G06F 2203/04103; G06F 2203/04105; G06F 2203/04106; G06F 2203/04107
See application file for complete search history.

(56) References Cited

U.S. PATENT DOCUMENTS

2014/0204285 A1 * 7/2014 Jang .................. G06F 3/044 349/12
2014/0267156 A1 * 9/2014 Koga .................. G06F 3/044 345/174

(Continued)

FOREIGN PATENT DOCUMENTS

WO  WO 2014114233 A1 * 7/2014 ............. G06F 3/044
WO  WO 2015047374 A1 * 4/2015 ........... G06F 3/0412

*Primary Examiner* — Stacy Khoo
(74) *Attorney, Agent, or Firm* — Cooper Legal Group, LLC

(57) ABSTRACT

The present invention discloses a display device with a three-dimensional input module, and the device includes a pressure sensor, a display module having a position input function, and a common controller. The pressure sensor is used for detecting pressing force values of multiple points in Z direction. The display module having the position input function is disposed on one side of the pressure sensor and used for detecting press positions of multiple points in X direction and Y direction and displaying. The common controller generates pixel-scanning pulses and touch-scanning pulses for the display module having the position input function, and generates pressure-scanning pulses for the pressure sensor to detect multiple input positions and multiple pressing force values corresponding to the multiple input positions. The display device with the three-dimensional input module has advantages of simple hardware design and better noise immunity.

20 Claims, 13 Drawing Sheets

(52) U.S. Cl.
CPC .. *G06F 3/0414* (2013.01); *G06F 2203/04101* (2013.01); *G06F 2203/04102* (2013.01); *G06F 2203/04103* (2013.01); *G06F 2203/04105* (2013.01); *G06F 2203/04107* (2013.01)

(56) References Cited

U.S. PATENT DOCUMENTS

| | | | |
|---|---|---|---|
| 2015/0002447 A1* | 1/2015 | Schediwy | G06F 1/1692 345/174 |
| 2015/0161954 A1* | 6/2015 | Tokita | G06F 3/0412 345/174 |
| 2015/0242017 A1* | 8/2015 | Liao | G06F 3/044 345/174 |
| 2016/0011705 A1* | 1/2016 | Huang | G06F 3/044 345/174 |
| 2016/0062497 A1* | 3/2016 | Huppi | G06F 3/0414 345/177 |
| 2016/0092010 A1* | 3/2016 | Agarwal | G06F 3/0412 345/173 |

* cited by examiner

DISPLAY DEVICE WITH THREE-DIMENSION INPUT MODULE

RELATED APPLICATIONS

This application claims priority to China Application Serial Number 201510404595.1, filed Jul. 10, 2015, and China Application Serial Number 201510577932.7, filed Sep. 11, 2015, which are herein incorporated by reference.

BACKGROUND

Technical Field

The present invention relates to a display device with a three-dimensional input module.

Description of Related Art

With the development of touch technology, most current electronic devices, no matter whether industrial electronic devices or consumer electronics, adopt display devices having the touch functions. When the surface of the display device having the touch function receives an operation by finger or stylus, etc., the electronic device performs a specific operation through detecting a position of the touch point. As for the detection of a touch point, no matter a capacitive touch screen or a resistive touch screen can ascertain the two-dimensional coordinates of the touch point on the display device by using different principles. When considering the establishment of the two-dimensional coordinate system (X,Y) on the surface of the display device, detecting the touch point is equivalent to ascertaining a position of the touch point on the X-axis and a position of the touch point on the Y-axis, that is, ascertaining a two-dimensional position of the touch point.

In order to further enrich the display device having the touch function, currently a pressure sensor has already been installed in some of the display devices. The pressure sensor comprises a plurality of pressure sensing units. The pressure sensing unit located at the touch point senses a pressing force perpendicular to the display device (equivalent to the Z direction) and will generate a specific deformation to cause a change of an electrical signal at the position where the pressure sensing unit is located. Detecting the electrical signal can ascertain the pressure received by the pressure sensing unit. When touch points at different positions match different pressing force values, device functions can be disposed correspondingly. That is, designs can be enriched by using the three-dimensional (3D) angle defined by the touch point (X, Y) and the pressure (Z) so as to form the display device with a three-dimensional input module.

However, today the electronic devices tend to be light, thin, and cheap. The pressure sensor disposed in the display device increases the thickness of the display device, significantly increases the cost, and makes the hardware design very complex. In addition, due to the increase of the integration of the touch display device, the arrangement of various components and wires become increasingly compact. Interferences between electrical signals are very serious, which in turn decreases detection accuracies of positions of touch points and pressing force values.

For the foregoing reasons, there is a need to solve the problems of complex hardware and serious interferences between signals by providing a display device with a three-dimensional input module, which is also a major issue that the industry is eager to solve.

SUMMARY

In order to overcome the problem resulting from the intricate hardware structure in the typical display device with a three-dimensional input module, the present invention provides a display device with a three-dimensional input module having a simple hardware design.

A display device with a three-dimensional input module is provided. The display device with the three-dimensional input module comprises a pressure sensor, a display module having a position input function, and a common controller. The pressure sensor is used for detecting pressing force values of multiple points in Z direction. The display module having the position input function is disposed on one side of the pressure sensor and used for detecting press positions of multiple points in X direction and Y direction and displaying. The common controller generates pixel-scanning pulses and touch-scanning pulses for the display module having the position input function, and generates pressure-scanning pulses for the pressure sensor so as to detect multiple input positions and multiple pressing force values corresponding to the multiple input positions.

In the foregoing, the pressure sensor comprises a first pressure layer on which at least one pressure sensing unit is disposed and a second pressure layer on which at least one pressure sensing unit is disposed. The first pressure layer and the second pressure layer are disposed on at least one flexible substrate.

In the foregoing, a number of the pressure sensing units disposed on the first pressure layer ranges from 10 to 100. A number of the pressure sensing units disposed on the second pressure layer ranges from 10 to 100.

In the foregoing, an arrangement of the pressure sensing units disposed on the first pressure layer is misaligned with an arrangement of the pressure sensing units disposed on the second pressure layer.

In the foregoing, the display device with the three-dimensional input module further comprises a metal layer disposed between the pressure sensor and the display module having the position input function.

In the foregoing, the display module having the position input function is an embedded touch panel.

In the foregoing, a plurality of pixel units arranged in an array and a plurality of touch units arranged in an array are disposed in the display module having the position input function. An arranged density of the pixel units is greater than or equal to an arranged density of the touch units. The arranged density of the touch units is greater than or equal to an arranged density of the pressure sensing units in pressure sensor.

In the foregoing, the common controller comprises a driving pulse processing circuit and a common driver. The driving pulse processing circuit comprises a selection circuit and/or an pulse reforming circuit. The common driver, the selection circuit, and the pulse reforming circuit are electrically connected in sequence.

In the foregoing, the common controller comprises a driving pulse processing circuit and a common driver. The driving pulse processing circuit performs process to signals outputted from the common driver. The processes comprise shifting, narrowing pulses widths, frequency division or a combination thereof.

In the foregoing, the pixel-scanning pulses, the touch-scanning pulses, and the pressure-scanning pulses are performed with different time sequence and are alternated seamlessly, or are alternately performed with time intervals.

In the foregoing, the common controller comprises a plurality of drive lines for providing the pixel-scanning pulses, the touch-scanning pulses, and the pressure-scanning pulses. The pressure sensor comprises at least one pressure sensing unit. The display module having the position input function comprises a plurality of pixel units arranged in an array and a plurality of touch units arranged in an array. At least two of the pressure sensing unit, the pixel units, and the touch units share the drive lines.

In the foregoing, the common controller comprises a plurality of drive lines for providing the pixel-scanning pulses. The drive lines sequentially provide the touch-scanning pulses and the pressure-scanning pulses after providing the pixel-scanning pulses.

In the foregoing, each of the pressure-scanning pulses and/or the touch-scanning pulses comprises one or more narrow pulses.

The invention provides a display device with a three-dimensional input module. The display device with the three-dimensional input module comprises a three-dimensional input module, a display module, and a common controller. The three-dimensional input module is used for detecting press positions of multiple points in X direction and Y direction and pressing force values of multiple points in Z direction. The display module is disposed on one side of the three-dimensional input module for displaying. The common controller generates pixel-scanning pulses for the display module, and generates touch-scanning pulses and pressure-scanning pulses for a pressure sensor of the three-dimensional input module so as to detect multiple input positions and multiple pressing force values corresponding to the multiple input positions.

In the foregoing, the display device with the three-dimensional input module further comprises a metal layer disposed between the three-dimensional input module and the display module.

As compared with the prior art, the display device with the three-dimensional input module according to the present invention has the following advantages: First, when the display device with the three-dimensional input module displays, not only the positions of the touch points, but also the pressure values of the touch points can be detected. The touch sensor and the pressure sensor are driven by the same common driver. Therefore, the hardware cost is reduced, the hardware circuit design is simplified, the integration of the display device with the three-dimensional input module is increased, and the thickness and weight of the display device with the three-dimensional input module are reduced to a certain extent. The touch sensor and the pressure sensor and wires of the display module are close in terms of structure. The prior art uses different drivers to respectively drive the pixel units, the touch units, and the pressure sensing units. The design space is relatively small. The arrangement of components is compact, which is disadvantageous for heat dissipation. The present invention provides a good solution to this problem. Second, since the capacitive touch panel employs the principle of human body induced current to detect the touch points, which is very susceptible to interferences between signals to cause inaccuracies in detecting the positions of the touch points. The present invention cleverly utilizes the common driver that provides the gate-scanning pulses to the pixel units through the selection circuit and/or the pulse reforming circuit, and provides the pressure-scanning pulses and the touch-scanning pulses after performing processes, such as selecting, shifting, narrowing the pulse widths, and frequency division, etc. through the selection circuit and/or the pulse reforming circuit. The gate-scanning pulses, the pressure-scanning pulses, and the touch-scanning pulses may be performed with different time sequence. When the time sequence of them is different, the gate-scanning pulses, the pressure-scanning pulses, and the touch-scanning pulses are performed for different durations. Therefore, the interferences between the electrical signals are significantly reduced. Touch stability of the display device with the three-dimensional input module is remarkably improved. Third, the present invention adopts the Wheatstone bridge to detect the pressing force value. The circuit structure is simple. The control accuracy is high. Most importantly, the pressure signal processor uses the bridge and the multiway multiplexer combined with each other. Different pressure sensing units are selected through the multiway multiplexer. However, in the Wheatstone bridges constituted by different pressure sensing units when detecting the pressure signals, the resistor Ra and the resistor Rb are shared resistors. Such a design can significantly decrease a number of resistors in the Wheatstone bridges. In addition, when the different pressure sensing units perform pressure detection, error rates between them are reduced because some of their hardware is shared. In greater detail, the internal resistors RF0, RF1, RF2 . . . RFn corresponding to the pressure sensing units are respectively disposed corresponding to RC0, RC1, RC2 . . . RCn, and they are respectively reference resistors for each other. Since the reference resistors are disposed adjacent to RF0, RF1, RF2 . . . RFn, temperature effects on them are consistent, and noise effects on them are similar. It is therefore advantageous for the Wheatstone bridges to be stable so as to reduce misjudgments of signals caused by temperature drift of the hardware circuit itself and environmental factors. Because RF0, RF1, RF2 . . . RFn and RC0, RC1, RC2 . . . RCn are respectively reference resistors for each other, this reduces noises while optimizing the allocation of resources. A signal output terminal of the Wheatstone bridge is connected to the operational amplifier circuit. The operational amplifier circuit not only can amplify the electrical output signal U0, but also can reduce noises by utilizing its property of noise suppression. Take RF0 and RC0 as an example for illustration. When the upper substrate receives the pressing force, a resistance value change of RF0 is $\Delta r$. However, RF0 is actually interfered with by temperature and other factors to generate a noise of $\Delta s$. As for the reference resistor RC0, it is also interfered with by temperature and other factors in the same manner as RF0 adjacent to RC0 to generate the noise $\Delta s$ having the same magnitude. The noise $\Delta s$ after being inverted at the inverting input terminal of the operational amplifier circuit is cancelled out by the noise of the voltage dependent resistor RF0 at the non-inverting input terminal. Hence, interferences caused by other noises are remarkably reduced to further improve the accuracies in detecting the pressure signal.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
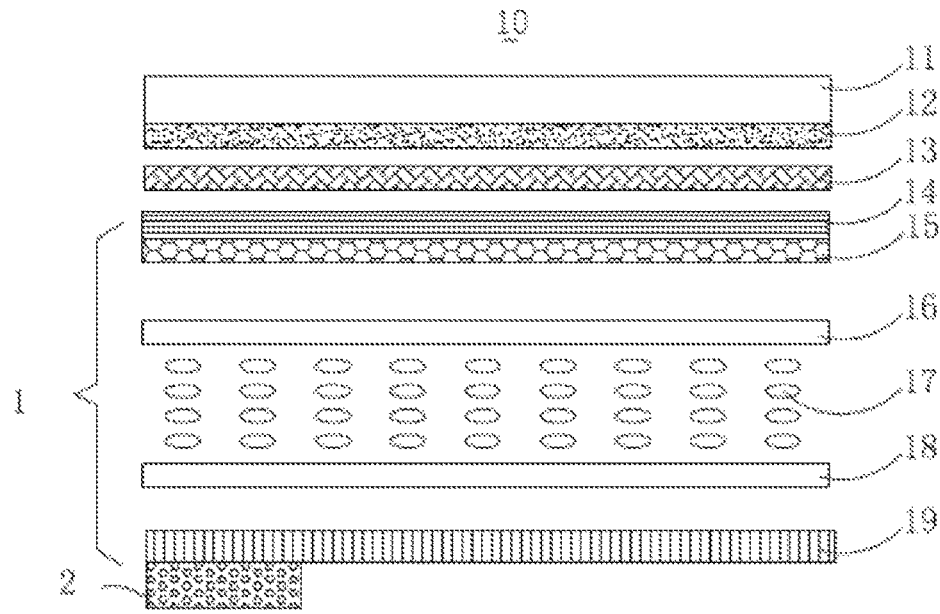
FIG. 1 depicts a schematic diagram of a layered structure of a display device with a three-dimensional input module according to a first embodiment of this invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and elements are schematically depicted in order to simplify the drawings. Wherever possible, the same reference numbers are used in the drawings and the description to refer to the same or like parts.

A description is provided with reference to FIG. 1. A display device with a three-dimensional input module 10 according to a first embodiment of this invention comprises an upper substrate 11, a bonding layer 12, a pressure layer 13, a display module having a position input function 1, and a signal processing circuit 2 from top to bottom (the position terms "upper", "lower", "left", "right", and the like referred herein are used to describe relative positions in the designated views, rather than the absolute positions). The pressure layer 13 is bonded to the upper substrate 11 through the bonding layer 12. The pressure layer 13 and the display module having the position input function 1 are electrically connected to the signal processing circuit 2 through wires. The signal processing circuit 2 is disposed on a lower side of the display module having the position input function 1. However, a position of the signal processing circuit 2 is not limited, the signal processing circuit 2 may be disposed on an upper side or on any side of the display module having the position input function 1, or at any suitable position.

The display module having the position input function 1 comprises an upper polarizer 14, a touch sensor 15 (or called touch transducer), an upper substrate 16, a liquid crystal layer 17, a lower substrate 18, and a lower polarizer 19 from top to bottom. The liquid crystal layer 17 is interposed between the upper substrate 16 and the lower substrate 18. The touch sensor 15 is disposed on a lower surface of the upper polarizer 14. Of course, a position of the touch sensor 15 is not limited. The touch sensor 15 may be disposed on an upper/a lower surface of the upper substrate 16, or an upper/a lower surface of the lower substrate 18, or an upper surface of the lower polarizer 19. The display module having the position input function 1 may be an embedded touch panel, such as an in-cell LCD, an on-cell LCD, or an on-cell AMOLED.

The upper substrate 11 may be regarded as a touch cover plate on a traditional touch panel. The touch cover plate comprises a touch operation surface and a component mounting surface (not shown in the figure). The touch operation surface is used for touch operation by finger, stylus, and the like. The component mounting surface is used for mounting touch electrode components or a display panel, etc.

The bonding layer 12 may be selected from an optical clear adhesive (OCA) and a liquid optical clear adhesive (LOCA).

Figure 2A:
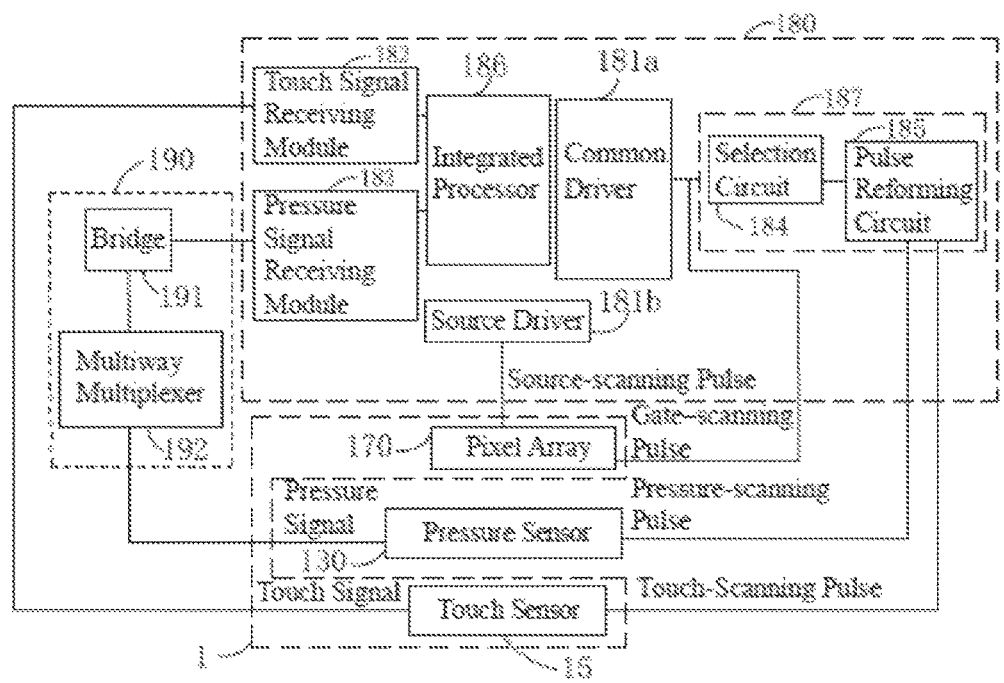
FIG. 2A depicts a block schematic diagram of a circuit structure of the display device with the three-dimensional input module according to the first embodiment of this invention.
Figure 3:
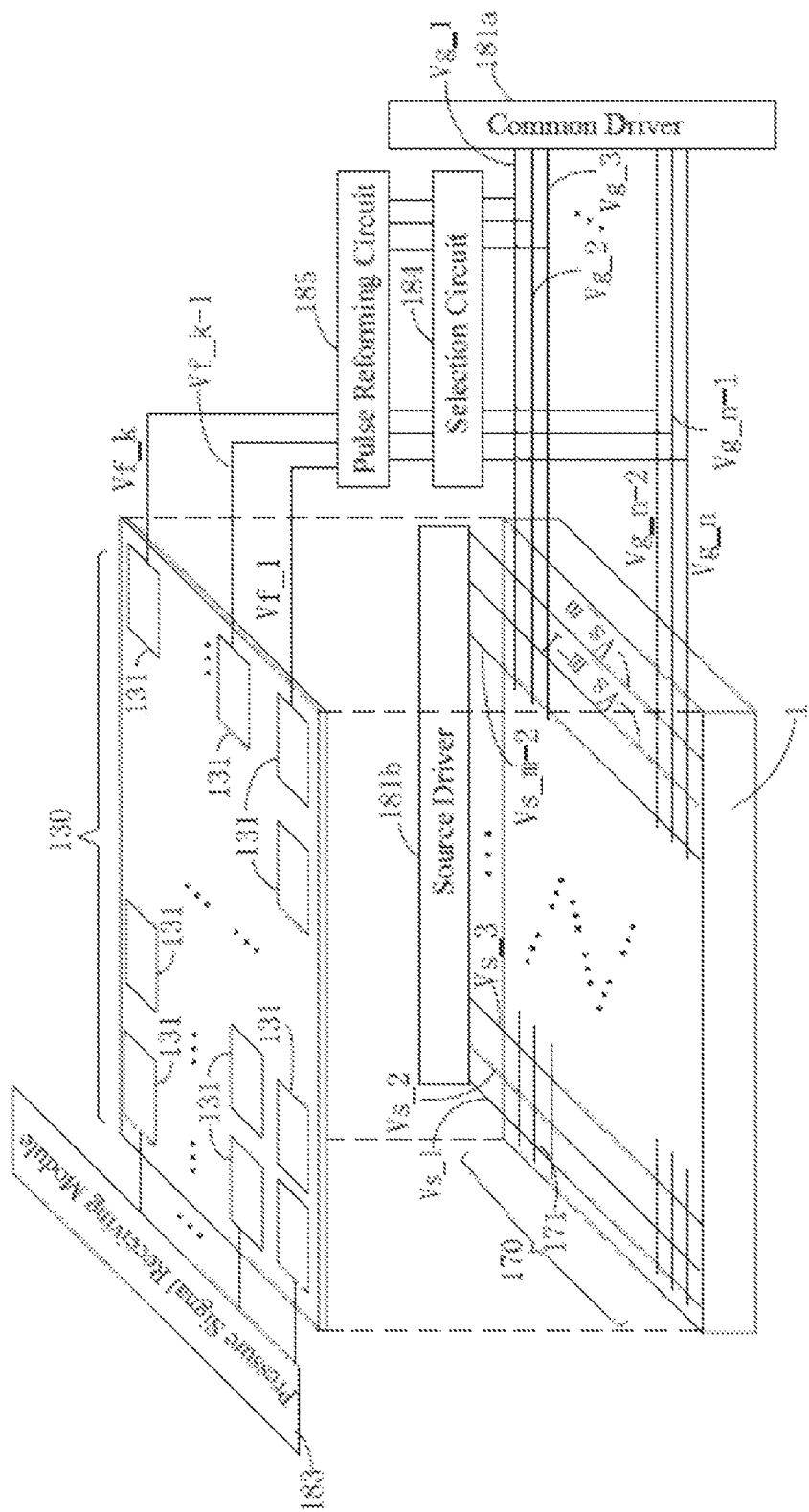
FIG. 3 depicts a schematic diagram of a three-dimensional structure of the display device with the three-dimensional input module according to the first embodiment of this invention.

A description is provided with reference to FIG. 2A and FIG. 3 (FIG. 3 does not illustrate the drive lines of touch units. The touch units and the pixel units 171 may share drive lines or the drive lines are independently disposed for touch units). The touch sensor 15 comprises a plurality of touch units (not shown in the figure) arranged in an array disposed on the lower surface of the upper polarizer 14. The plurality of touch units are controlled by time sequence of touch-scanning pulses to detect positions of touch points on the upper substrate 11.

The display module having the position input function 1 comprises a pixel array 170. The pixel array 170 comprises a plurality of pixel units 171 arranged in an array. The pixel units 171 control a display effect according to time sequence of source-scanning pulses and gate-scanning pulse.

A pressure sensor 130 (or called pressure transducer, force transducer or force sensor), is disposed on the pressure layer 13. The pressure sensor 130 comprises a plurality of pressure sensing units 131 arranged in an array. The plurality of pressure sensing units 131 are controlled by pressure-scanning pulses to detect pressing force values at the touch points on the upper substrate 11. A number of the pressure sensing units 131 disposed on the pressure layer 13 ranges from 10 to 100, and preferably ranges from 17 to 45.

An arranged density of the pixel units 171 in the display module having the position input function 1 is greater than or equal to an arranged density of the touch units (not shown in the figure). The arranged density of the touch units 171 is greater than or equal to an arranged density of the pressure sensing units 131 in the pressure sensor 130.

The signal processing unit 2 comprises a common controller 180 and a pressure signal processor 190. The pressure sensor 130 is electrically connected to the common controller 180 and the pressure signal processor 190. The touch sensor 15 is electrically connected to the common controller 180.

The pressure signal processor 190 processes a pressure signal detected by the pressure sensor 130, which comprises a bridge 191 and a multiway multiplexer 192. The multiway multiplexer 192 is electrically connected to the bridge 191.

The common controller 180 comprises a common driver (which also has a function of a gate driver of the pixel units 171) 181a, a source driver 181b, a driving pulse processing circuit 187, a touch signal receiving module 182, a pressure signal receiving module 183, and an integrated processor 186. The common driver 181a generates gate-scanning pulses $Vg\_1 \sim Vg\_n$ according to signals to be displayed to instruct the pixel units 171 with update time sequence of displayed colors. The source driver 181b generates source-scanning pulses $Vs\_1 \sim Vs\_m$ according to the signals to be displayed to instruct color display intensities of the pixel units 171. The driving pulse processing circuit 187 comprises a selection circuit 184 and an pulse reforming circuit 185. The selection circuit 184 and the pulse reforming circuit 185 are used for processing the gate-scanning pulses $Vg\_1 \sim Vg\_n$ outputted from the common driver 181a. The gate-scanning pulses $Vg\_1 \sim Vg\_n$ are modulated by the selection circuit 184 and the pulse reforming circuit 185 so as to provide the pressure sensor 130 with pressure-scanning pulses $Vf\_1 \sim Vf\_k$ to control time sequence of the pressure sensing units 131, and provide the touch sensor 15 with touch-scanning pulses $Vt\_1 \sim Vt\_p$ so as to control the time sequence to detect touch points.

In practical applications, in order to cooperate with and satisfy characteristics and requirements of the touch sensor 15 and the pressure sensor 130, the selection circuit 184 and the pulse reforming circuit 185 can generate pulse widths and square wave amplitudes different from the gate-scanning pulses after processing the gate-scanning pulses $Vg\_1 \sim Vg\_n$ outputted from the common driver 181a, so as to provide suitable pulse signals depending on requirements of each of the sensors. In the present embodiment, the square wave is a common signal type processed by a touch display module, but the present invention is not limited in this regard. The signal may be in any suitable waveform.

After the pressure sensor 130 detects the pressure signal, an electrical signal is transmitted to the pressure signal processor 190. The pressure signal processor 190 processes the pressure signal, and then transmits the pressure signal to the pressure signal receiving module 183 in the common controller 180. After the touch sensor 15 detects a touch signal, the signal is transmitted to the touch signal receiving module 182. The integrated processor 186 processes the electrical signals of the touch signal receiving module 182 and the pressure signal receiving module 183, such as performing computations.

Figure 2B:
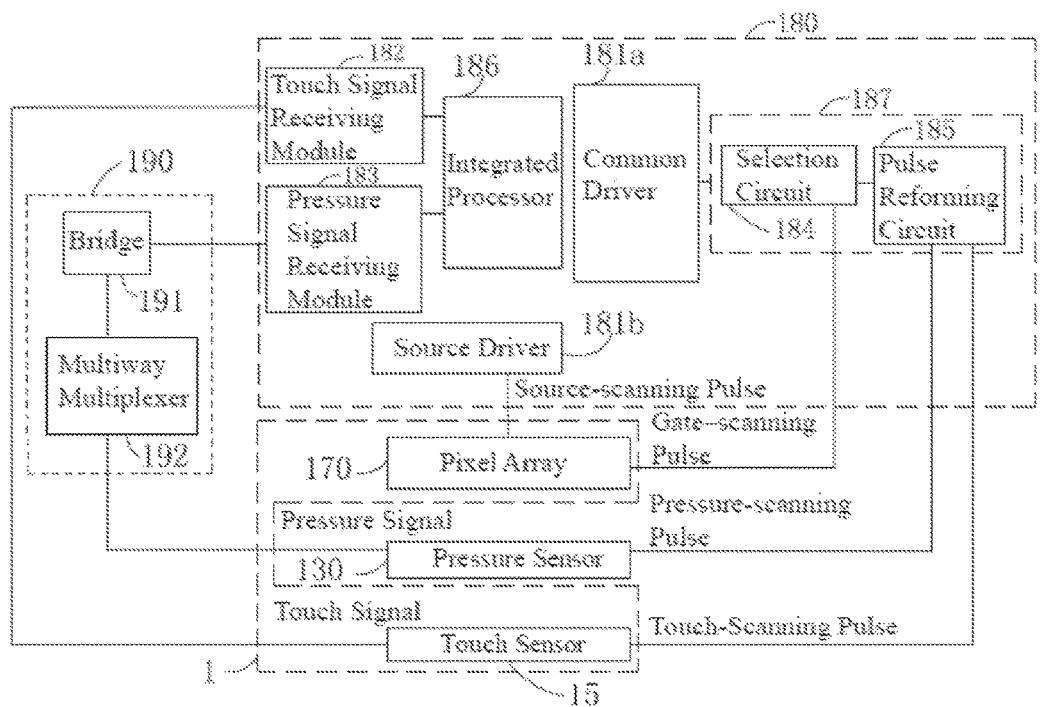
FIG. 2B depicts a block schematic diagram of a transformed circuit structure of the display device with the three-dimensional input module according to the first embodiment of this invention.

The selection circuit 184 may select part of signals from the gate-scanning pulses $Vg\_1 \sim Vg\_n$ to output the part of the signals, for example, the gate-scanning pulses in odd-numbered rows are selected. The pulse reforming circuit 185 processes pulse signals outputted from the selection circuit 184 in the way such as shifting, narrowing the pulse widths, frequency division, and the like. In practice, the driving pulse processing circuit 187 may only include the pulse reforming circuit 185/or the selection circuit 184 disposed therein, and the selection or processing of the gate-scanning pulses $Vg\_1 \sim Vg\_n$ is completed through using the selection circuit 184 or the pulse reforming circuit 185. As shown in FIG. 2B, the common driver 181a outputs signals to be modulated by the selection circuit 184 so as to provide the gate-scanning pulses. The common driver 181a outputs the signals to be modulated by the selection circuit 184 and the pulse reforming circuit 185 so as to provide the pressure-scanning pulses and the touch-scanning pulses. The pressure signal processor 190 may be disposed separate from the common controller 180, or the pressure signal processor 190 may be integrated into the common controller 180 and disposed on a same chip.

Figure 4:
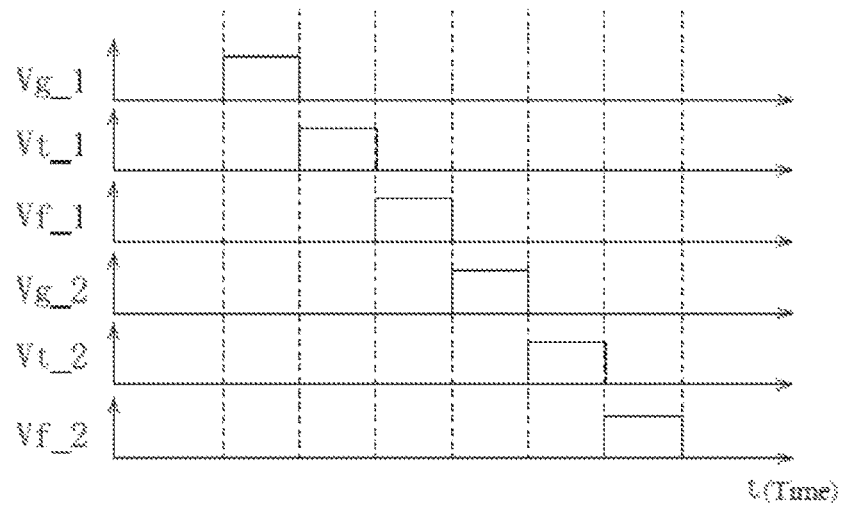
FIG. 4 depicts a time sequence diagram of touch-scanning pulses, pressure-scanning pulses, and gate-scanning pulses of the display device with the three-dimensional input module according to the first embodiment of this invention.

A description is provided with reference to FIG. 4. The common driver 181a provides the gate-scanning pulses Vg_1~Vg_n. The signals are modulated by the selection circuit 184 and the pulse reforming circuit 185 so as to form a time sequence diagram of the touch-scanning pulses and the pressure-scanning pulses as shown in FIG. 4 (all time sequence diagrams in the present invention use only specific sets of time sequence diagrams to represent the tendencies of electrical signal changes, the actual number of time sequence diagrams match numbers of the touch units and the pressure sensing units). Vg_1, Vg_2 represent update time sequence of the gate-scanning pulses of two different pixel units 171. Vt_1, Vt_2 represent update time sequence of the touch-scanning pulses of two different touch units 151. The common controller 180 detects the positions of touch points on the substrate 11 by finger, stylus, an the like according to the time sequence of the touch-scanning pulses. Vf_1, Vf_2 represent update time sequence of the pressure-scanning pulses of two different pressure sensing units 131. The common controller 180 detects the pressing force values received at the touch points according to time sequence of the pressure-scanning pulses.

The gate-scanning pulses Vg_1 and Vg_2, the touch-scanning pulses Vt_1 and Vt_2, and the pressure-scanning pulses Vf_1 and Vf_2 are interlaced with one another, and are alternately performed without time interval. That is, the three are performed with different time sequence. Therefore, the gate-scanning pulses Vg_1 and Vg_2, the touch-scanning pulses Vt_1 and Vt_2, and the pressure-scanning pulses Vf_1 and Vf_2 are performed in different operating periods so as to avoid electrical interferences between one another. In this embodiment, time intervals are not respectively disposed between the adjacent gate-scanning pulse and touch-scanning pulse, between the adjacent touch-scanning pulse and pressure-scanning pulse, and between the adjacent gate-scanning pulse and pressure-scanning pulse. However, in another embodiment, time intervals are respectively disposed between the adjacent gate-scanning pulse and touch-scanning pulse, between the adjacent touch-scanning pulse and pressure-scanning pulse, and between the adjacent gate-scanning pulse and pressure-scanning pulse to avoid matching the potential switching points of one another. Since the signals being processed tend to be interfered with by one another at the potential switching points, avoiding the potential switching points between the signals can improve noise immunity of the display device with the three-dimensional input module 10.

Figure 5:
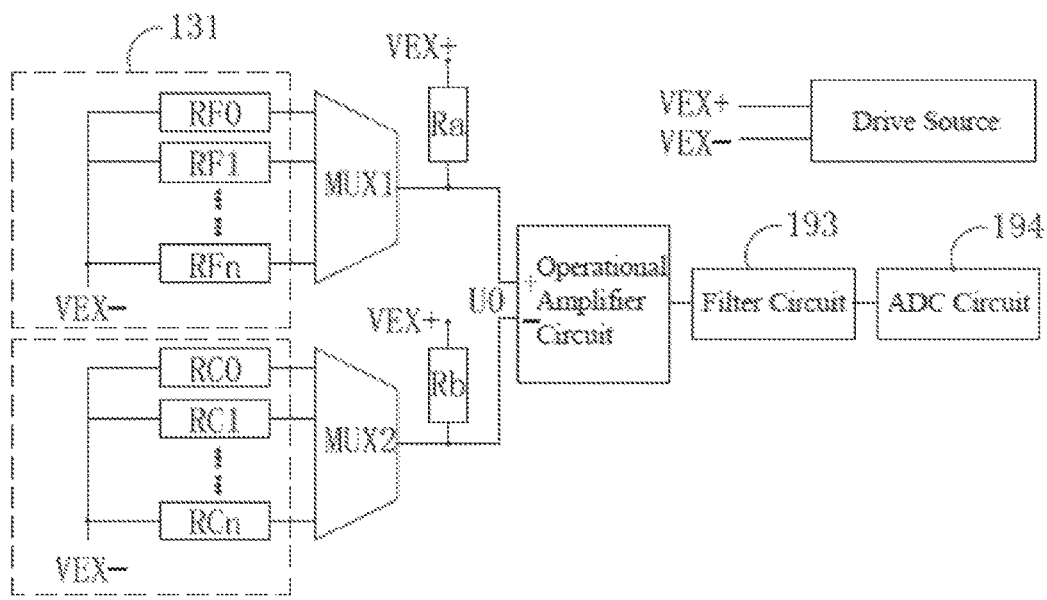
FIG. 5 depicts a schematic diagram of a circuit structure of the pressure signal processor in FIG. 2A.

A description is provided with reference to FIG. 5. The pressure signal processor 190 comprises the bridge 191 and the multiway multiplexer 192. The multiway multiplexer 192 comprises a first multiway multiplexer MUX1 and a second multiway multiplexer MUX2. The bridge 191 comprises at least one resistor Ra, at least one resistor Rb, and an operational amplifier circuit (not numbered). Output terminals of the first multiway multiplexer MUX1 and the second multiway multiplexer MUX2 respectively serve as a non-inverting input terminal and an inverting input terminal of the operational amplifier circuit, and an input signal U0 of the operational amplifier circuit is electrically connected to the operational amplifier circuit through the non-inverting input terminal and an inverting input terminal. An output terminal of the operational amplifier circuit is connected to a filter circuit 193 and an analog-to-digital converter (ADC) circuit 194. In this manner, electrical signals outputted from the operational amplifier circuit can be modulated by the filter circuit 193 to be denoised and then transmitted to the ADC circuit 194 for analog-to-digital conversion. The output terminal of the first multiway multiplexer MUX1 is connected to one end of the resistor Ra, the other end of the resistor Ra is electrically connected to a positive terminal VEX+ of a drive source. The output terminal of the second multiway multiplexer MUX2 is connected to one end of the resistor Rb, the other end of the resistor Rb is electrically connected to the positive terminal VEX+ of the drive source. In relevant embodiments, the drive source is so disposed that a method of single power supply or dual power supply is adopted, but the present invention is not limited in this regard. A drive signal may adopt a suitable given signal, such as a square wave, a sine wave, or a constant voltage signal, etc. A type of the drive signal is not limited. Preferably, the drive source may use the pressure-scanning pulses in a square waveform disclosed in each of the embodiments according to the present invention as signals provided by the drive source, so as to drive the pressure sensor and detect changes.

An input terminal of the first multiway multiplexer MUX1 is connected to the plurality of pressure sensing units 131 of a first group of the pressure sensor. Internal resistors corresponding to the plurality of pressure sensing units 131 of the first group are RF0, RF1, RF2 . . . RFn. When a user touches the upper substrate 11 and generates a certain pressure, resistance values of the internal resistors RF0, RF1, RF2 . . . RFn corresponding to the pressure sensing units 131 underneath the upper substrate 11 change to cause changes of the pressure signals of the pressure sensor. The first multiway multiplexer MUX1 can select any one of the internal resistances RF0, RF1, RF2 . . . RFn as an input of the first multiway multiplexer MUX1.

An input terminal of the second multiway multiplexer MUX2 is connected to the plurality of pressure sensing units 131 of a second group of the pressure sensor. Internal resistors corresponding to the plurality of pressure sensing units 131 of the second group are RC0, RC1, RC2 . . . RCn, which are disposed respectively associated with and adjacent to RF0, RF1, RF2 . . . RFn. For example, RC0 is disposed adjacent to RF0, RC1 is disposed adjacent to RF1, and so forth. RC0, RC1, RC2 . . . RCn and RF0, RF1, RF2 . . . RFn are respectively reference resistors for each other. The second multiway multiplexer MUX2 can select any one of the internal resistances RC0, RC1, RC2 . . . RCn as an input of the second multiway multiplexer MUX2. When the pressure sensing units 131 corresponding to RF0, RF1, RF2 . . . RFn receive a pressing force, RC0, RC1, RC2 . . . RCn respectively serve as the reference resistors for RF0, RF1, RF2 . . . RFn. On the contrary, when the pressure sensing units 131 corresponding to RC0, RC1, RC2 . . . RCn receive the pressing force. RF0, RF1, RF2 . . . RFn respectively serve as the reference resistors for RC0, RC1, RC2 . . . RCn, and one end of each of RF0, RF1, RF2 . . . RFn and RC0, RC1, RC2 . . . RCn is connected to a negative terminal VEX− of a drive source.

Figure 6A:
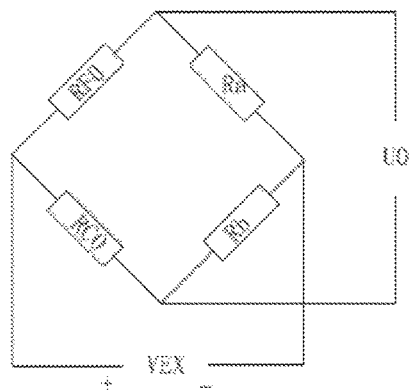
FIG. 6A depicts a schematic diagram of a detection principle of pressure signals in FIG. 5.

A description is provided with reference to FIG. 6A. Take the first multiway multiplexer MUX1 selecting RF0 and the second multiway multiplexer MUX2 selecting RC0 as an example to illustrate the working principle of the pressure sensor. The internal resistor RF0, the internal resistor RC0, the resistor Ra, and the resistor Rb constitute a Wheatstone bridge. When no pressing force is applied, the Wheatstone bridge is in an equilibrium state. The drive source provides the bridge 191 with a regulated power supply. The positive polarity and negative polarity of the regulated power supply are not considered when it is connected. A direct current (DC) regulated power supply is preferably selected according to the present embodiment. When a user operates on the upper substrate 11, a pressing force is applied to the upper substrate 11. One or more resistance values of the internal resistors RF0, RF1, RF2 . . . RFn in the pressure sensor change correspondingly. The equilibrium of the Wheatstone bridge is thus broken so that an electrical output signal U0 is definitely changed. Changes of different resistance values correspond to different pressure values. Hence, through calculating and processing the electrical output signal U0 of the Wheatstone bridge, a pressure value can be obtained correspondingly. In practice, a common resistor may be disposed depending on needs to replace RC0, RC1, RC2 . . . RCn.

Figure 6B:
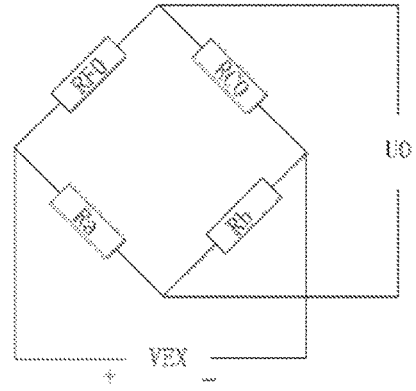
FIG. 6B depicts a schematic diagram of another detection principle of pressure signals in FIG. 5.

In one embodiment, as shown in FIG. 6B, Ra and RC0 may replace each other to form another type of bridge.

It is noted that, in a preferred embodiment, the resistors (that is, the resistor Ra and the resistor Rb) can select to use variable resistors, which are programmably and dynamically adjusted through a circuit so that a plurality of bridges constituted by RFn, RCn, Ra, and Rb correspondingly reach equilibrium.

As compared with the prior art, the display device with the three-dimensional input module 10 according to the present invention has the following advantages: First, when the display device with the three-dimensional input module 10 displays, not only the positions of the touch points but also the pressure values of the touch points can be detected. The touch sensor and the pressure sensor are driven by the same common driver 181a, the hardware cost is reduced, the hardware circuit design is simplified, the integration of the display device with the three-dimensional input module 10 is increased, and the thickness and weight of the display device with the three-dimensional input module 10 are reduced to a certain extent. The touch sensor and the pressure sensor and wires of the display module having the position input function 1 are close in terms of structure. The prior art uses different drivers to respectively drive the pixel units 171, the touch units, and the pressure sensing units 131. The design space is relatively small. The arrangement of components is compact, which is disadvantageous for heat dissipation. The present invention provides a good solution to this problem. Second, since the capacitive touch panel employs the principle of human body induced current to detect the touch points, which is very susceptible to interferences between signals to cause inaccuracies in detecting the positions of the touch points. The present invention cleverly utilizes the common driver 181a that provides the gate-scanning pulses to the pixel units 171a through the selection circuit 184 and/or the pulse reforming circuit 185, and provides the pressure-scanning pulses and the touch-scanning pulses after performing processes in the way such as selecting, shifting, narrowing the pulse widths, and frequency division. etc. through the selection circuit 184 and/or the pulse reforming circuit 185. The gate-scanning pulses, the pressure-scanning pulses, and the touch-scanning pulses may be performed with different time sequence. When the time sequence of them is different, the gate-scanning pulses, the pressure-scanning pulses, and the touch-scanning pulses are performed for different durations (or periods). Therefore, the interferences between the electrical signals are significantly reduced. Touch stability of the display device with the three-dimensional input module 10 is remarkably improved. Third, the present invention adopts the Wheatstone bridge to detect the pressing force value. The circuit structure is simple. The control accuracy is high. Most importantly, the pressure signal processor 190 uses the bridge 191 and the multiway multiplexer 192 combined with each other. Different pressure sensing units 131 are selected through the multiway multiplexer 192. However, in the Wheatstone bridges constituted by different pressure sensing units 131 when detecting the pressure signals, the resistor Ra and the resistor Rb are common resistors. Such a design can significantly decrease a number of resistors in the Wheatstone bridges. In addition, when the different pressure sensing units 131 perform pressure detection, error rates between them are reduced because some of their hardware is shared. In greater detail, the internal resistors RF0, RF1, RF2 . . . RFn corresponding to the pressure sensing units 131 are respectively disposed corresponding to RC0, RC1, RC2 . . . RCn, and they are respectively reference resistors for each other. Since the reference resistors are disposed adjacent to RF0, RF1, RF2 . . . RFn, temperature effects on them are consistent, and noise effects on them are similar. It is therefore advantageous for the Wheatstone bridges to be stable so as to reduce misjudgments of signals caused by temperature drift of the hardware circuit itself and environmental factors. Because RF0, RF1, RF2 . . . RFn and RC0, RC1, RC2 . . . RCn are respectively reference resistors for each other, this reduces noises while optimizing the allocation of resources. A signal output terminal of the Wheatstone bridge is connected the operational amplifier circuit. The operational amplifier circuit not only can amplify the electrical output signal U0, but also can reduce noises by utilizing its property of noise suppression. Take RF0 and RC0 as an example for illustration. When the upper substrate 11 receives the pressing force, a resistance value change of RF0 is $\Delta r$. However, RF0 is actually interfered with by temperature and other factors to generate a noise of $\Delta s$. As for the reference resistor RC0, it is also interfered with by temperature and other factors in the same manner as RF0 adjacent to RC0 to generate the noise $\Delta s$ having the same magnitude. The noise $\Delta s$ after being inverted at the inverting input terminal of the operational amplifier circuit is cancelled out by the noise of the voltage dependent resistor RF0 at the non-inverting input terminal. Hence, interferences caused by other noises are remarkably reduced to further improve the accuracies in detecting the pressure signal. Any means for cancelling noises feasible in the operational amplifier circuit may be used, such as $U=A((V+)-(V-))=A((V\Delta r+V\Delta s)-(-V\Delta r+V\Delta s))=2A\ V\Delta r$. $\Delta s$ is the noise effect triggered by external factors not affected by the reverse voltage. Using a differential amplifier or a combination of amplifiers are both means that can be adopted according to the present invention, but the present invention is not limited in this regard. As long as the circuit can eliminate the noise effect triggered by external factors, it is within the scope of the present invention.

Figure 7:
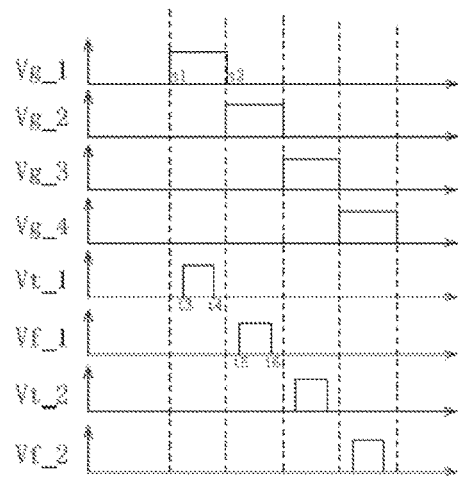
FIG. 7 depicts a time sequence diagram of touch-scanning pulses, pressure-scanning pulses, and gate-scanning pulses of a display device with a three-dimensional input module according to a second embodiment of this invention.

A description is provided with reference to FIG. 7. A display device with a three-dimensional input module (not numbered) is provided according to a second embodiment of this invention. The display device with the three-dimensional input module differs from the display device with the three-dimensional input module according to the first embodiment only in that: the changes of time sequence of the touch-scanning pulses, the pressure-scanning pulses, and the gate-scanning pulses are not consistent. In the present embodiment, both the touch-scanning pulses and the pressure-scanning pulse are performed according to the time sequence of the gate-scanning pulses. However, the touch-scanning pulses and the pressure-scanning pulses are performed with different time sequence. That is, the touch-scanning pulses and the pressure-scanning pulses are performed in different operating periods of the gate-scanning pulses. Pulse widths of the pressure-scanning pulses and touch scanning pulses become narrower after being modulated by the driving pulse processing circuit. In this manner, time intervals exist between the gate-scanning pulses and the pressure-scanning pulses and between the gate-scanning pulses and the touch scanning pulses. For example, the gate-scanning pulse Vg_1 switches electric potential at time t1 and time t2. The pulse width of the touch-scanning pulse Vt_1 that switches electric potential at time t3 and time t4 is narrower than a pulse width of the gate-scanning pulse. The pulse width of the pressure-scanning pulse Vf_1 that switches potential at time t5 and time t6 is narrower than the pulse width of the gate-scanning pulse, i.e. t1<t3<t4<t2<t5<t6. The potential switching points of the pixel units, the touch units, and the pressure sensing units are interlaced with one another. At the potential switching points, signals of the touch sensor, the pressure sensor, and the pixel units tend to be interfered with by one another to cause inaccuracies in detecting the positions of the touch points and the pressing force value. According to the present embodiment, through disposing a specific time interval between the gate-scanning pulses and the pressure-scanning pulses and between the gate-scanning pulses and the touch-scanning pulses, the potential switching points of the pressure-scanning pulses and the touch-scanning pulses are interlaced to avoid the signal interferences between one another. In practical operations, the pulse widths of the touch-scanning pulses and the pressure-scanning pulses are not wider than the pulse width of the gate-scanning pulses.

In all the embodiments of the present invention, "same time sequence" means that, within an operating period (electric potential is "1") of the gate-scanning pulse, an operating period of the pressure-scanning pulse/touch scanning pulse overlaps or partially overlaps the operating period of the gate-scanning pulse (does not include the overlap at the end of time sequence diagram). Conversely, it is "different time sequence".

Figure 8:
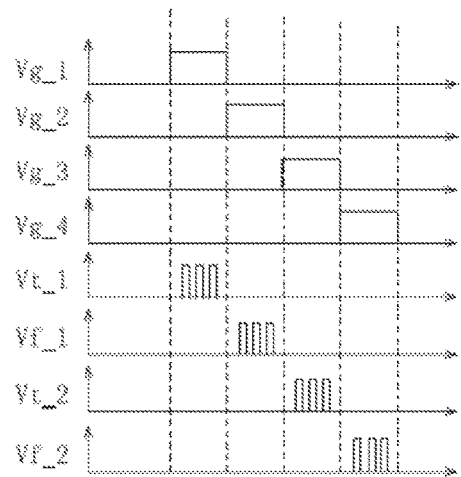
FIG. 8 depicts a time sequence diagram of touch-scanning pulses, pressure-scanning pulses, and gate-scanning pulses of a display device with a three-dimensional input module according to a third embodiment of this invention.

A description is provided with reference to FIG. 8. A display device with a three-dimensional input module (not numbered) is provided according to a third embodiment of this invention. The display device with the three-dimensional input module differs from the display device with the three-dimensional input module according to the first or second embodiment only in that: the time sequence of the touch-scanning pulses and the pressure-scanning pulses changes. The touch-scanning pulses and the pressure-scanning pulses are performed with different time sequence. That is, the touch-scanning pulses and the pressure-scanning pulses are performed in different operating periods of the gate-scanning pulse according to the present embodiment. The operating period of the touch-scanning pulses does not overlap the operating period of the pressure-scanning pulses. Each one of the pressure-scanning pulses and touch-scanning pulses comprises a plurality of short pulses to reduce noises. In FIG. 8, three short pulses are taken as an example for illustration. However, a number of the short pulses may be two or more than three.

Figure 9A:
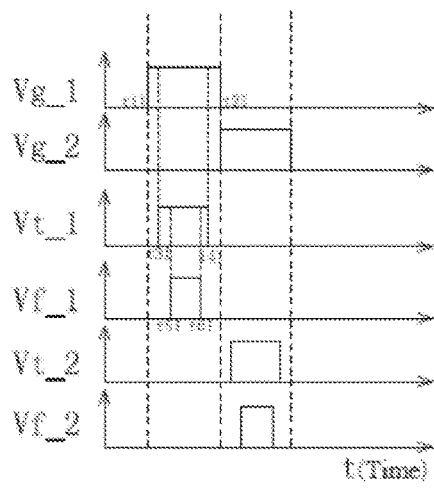
FIG. 9A and FIG. 9B respectively depict time sequence diagrams of touch-scanning pulses, pressure-scanning pulses, and gate-scanning pulses of display devices with three-dimensional input modules according to a fourth embodiment of this invention.
Figure 9B:
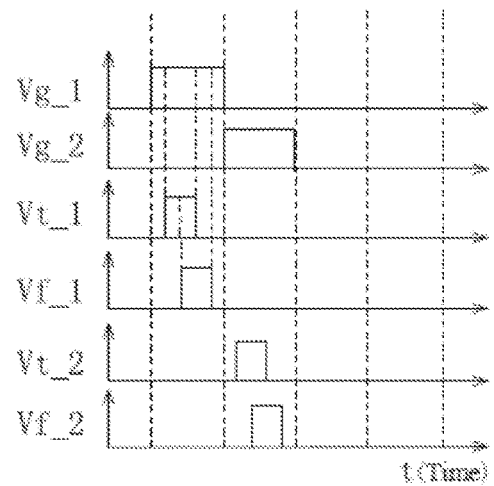

A description is provided with reference to FIG. 9A. A display device with a three-dimensional input module (not numbered) is provided according to a fourth embodiment of this invention. The display device with the three-dimensional input module differs from the display devices with the three-dimensional input modules according to the first to the third embodiments only in that: all the gate-scanning pulses, the touch-scanning pulses, and the pressure-scanning pulses are performed with same time sequence according to the present embodiment. That is, both the touch-scanning pulses and the pressure-scanning pulses are performed in same operating periods of the gate-scanning pulses. The operating periods of the touch-scanning pulses overlap the operating periods of the pressure-scanning pulses. In FIG. 9A, the pulse widths of the gate-scanning pulses, the touch-scanning pulses, and the pressure-scanning pulses become narrower sequentially so that the potential switching points of them are interlaced. For example, the gate-scanning pulse Vg_1 switches electric potential at time t11 and time t21. The pulse width of the touch-scanning pulse Vt_1 that switches electric potential at time t31 and time t41 (i.e. t11<t31, t21>t41) is narrower than the pulse width of the gate-scanning pulse. The pulse width of the pressure-scanning pulse Vf_1 is narrower than the pulse width of the touch-scanning pulse Vt_1, and t51>t31, t61<t41. The potential switching points are thus interlaced with one another. Even though interference signals are generated, the possibility that they interfere with one another is reduced. For example, the pressure-scanning pulse generates an interference signal at the potential switching point but the gate-scanning pulse and the touch scanning pulse are stable at this point, so that the interference signal has little effect on them. The gate-scanning pulse, the touch-scanning pulse, and the pressure-scanning pulse completely overlap within an operating period. In practice, the pulse widths of the touch-scanning pulses and the pressure-scanning pulses are not limited, they can be selected to partially overlap so as to avoid the potential switching points of one another. As shown in FIG. 9B, both the touch-scanning pulses and the pressure-scanning pulses are performed with same time sequence as the gate-scanning pulses. That is, both the touch-scanning pulses and the pressure-scanning pulses are performed in same operating periods of the gate-scanning pulses. However, the operating periods of the touch-scanning pulses only partially overlap the operating periods of the pressure-scanning pulses.

Figure 10:
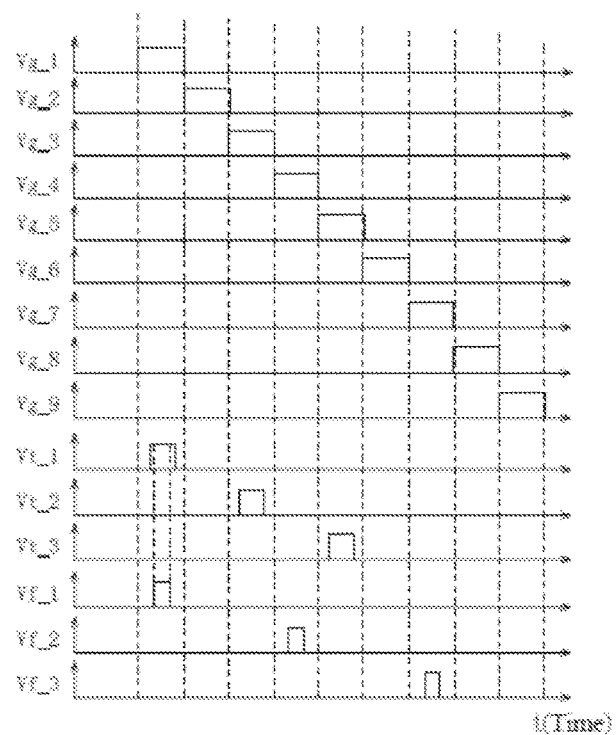
FIG. 10 depicts a time sequence diagram of touch-scanning pulses, pressure-scanning pulses, and gate-scanning pulses of a display device with a three-dimensional input module according to a fifth embodiment of this invention.

A description is provided with reference to FIG. 10. A display device with a three-dimensional input module (not numbered) is provided according to a fifth embodiment of this invention. The display device with the three-dimensional input module differs from the display devices with the three-dimensional input modules according to the first to the fourth embodiments only in that: the pulse width of the touch-scanning pulses becomes narrower, which is interlaced with the potential switching points of the gate-scanning pulses. The pulse width of pressure-scanning pulses is narrower than the pulse width of the touch-scanning pulses, and the potential switching points of the pressure-scanning pulses are also interlaced. A frequency of the gate-scanning pulse is set as Fg. A frequency of the touch-scanning pulse is set as Ft. A frequency of the pressure-scanning pulse is set as Ff, i.e. Fg>Ft>Ff. Since the display device with the three-dimensional input module sequentially reduces scan frequencies of the pixel units, the touch units, and the pressure sensing units, reducing scan frequencies of the touch-scanning pulses and the pressure-scanning pulses sequentially relative to a scan frequency of the gate-scanning pulses can similarly achieve the objectives of detecting the touch points and the pressing force. In addition, the energy loss of the display device with the three-dimensional input module is thus reduced. Preferably, Fg=(1~20)Ft, Fg=(1~50)Ff.

Figure 11:
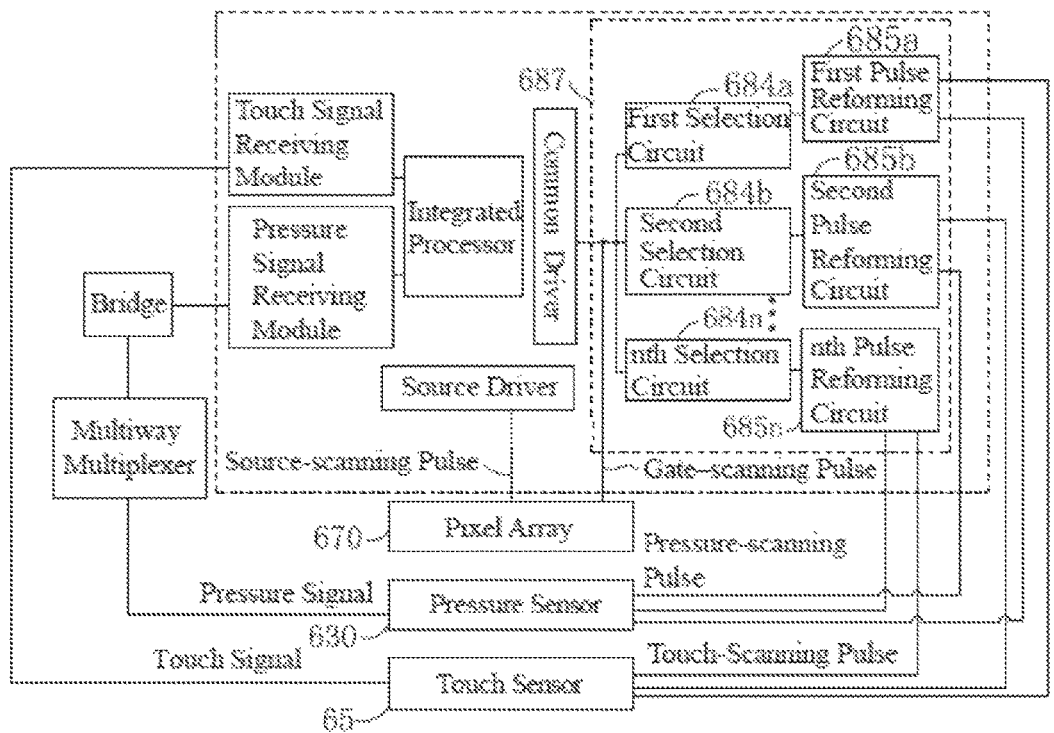
FIG. 11 depicts a block schematic diagram of a circuit structure of a display device with a three-dimensional input module according to a sixth embodiment of this invention.

A description is provided with reference to FIG. 11. A display device with a three-dimensional input module (not numbered) is provided according to a sixth embodiment of this invention. The display device with the three-dimensional input module differs from the display devices with the three-dimensional input modules according to the first to the fifth embodiments only in that: a driving pulse processing circuit 687 of the display device with the three-dimensional input module comprises multiway selection circuits and pulse reforming circuits: a first selection circuit 684a, a first pulse reforming circuit 685a, a second selection circuit 684b, a second pulse reforming circuit 685b . . . an nth selection circuit 684n, and an nth pulse reforming circuit 685n. The selection circuits and pulse reforming circuits of different groups respectively provide the touch units and the pressure sensing units of different groups with the touch-scanning pulses and the pressure-scanning pulses.

Figure 12:
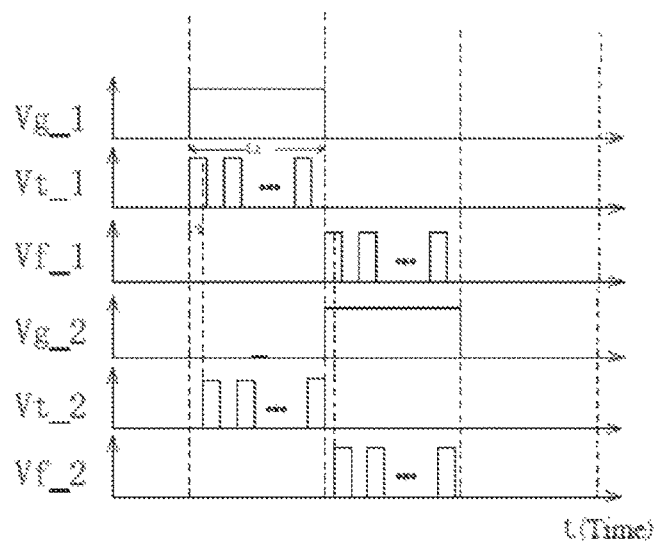
FIG. 12 depicts a time sequence diagram of touch-scanning pulses, pressure-scanning pulses, and gate-scanning pulses of the display device with the three-dimensional input module according to the sixth embodiment of this invention.

A description is provided with reference to FIG. 12. Two groups of touch units and pressure sensing units (not numbered) are taken as an example to illustrate the gate-scanning pulses, the touch-scanning pulses, and the pressure-scanning pulses outputted from the driving pulse processing circuit 687. It is set that: $Vg\_1$ and $Vg\_2$ are the gate-scanning pulses respectively received by a pixel unit 1 and a pixel unit 2 in a pixel array 670. $Vt\_1$ and $Vt\_2$ are touch-scanning pulses respectively received by a touch unit 1 and a touch unit 2 (1, 2 denote order numbers of the touch units rather than numbers shown in figures) on a touch sensor 65. $Vf\_1$ and $Vf\_2$ are pressure-scanning pulses respectively received by a pressure sensing unit 1 and a pressure sensing unit 2 (1, 2 denote order numbers of the pressure sensing units rather than numbers shown in figures) on a pressure sensor 630. The touch-scanning pulses and the pressure-scanning pulses are performed with different time sequence. That is, the touch-scanning pulses and the pressure-scanning pulses are performed in different operating periods of the gate-scanning pulses. An pulse period of the touch-scanning pulse is tz, which comprises a plurality of short pulse periods td. A delay of ts (ts<tz, ts≠n t d, n is a positive integer) exists between starting potential switching points of the touch-scanning pulses received by the touch unit 1 and the touch unit 2. Hence, the potential switching points of the touch-scanning pulses received by the touch unit 1 and the touch unit 2 are interlaced with each other. Similarly, the potential switching points of the pressure-scanning pulses received by the pressure sensing unit 1 and the pressure sensing unit 2 are also interlaced with each other. Interferences of electrical signals for the touch units and between the pressure sensing units are reduced. In addition, since the selection circuits and the pulse reforming circuits of plural groups are used to process the gate-scanning pulses so as to simultaneously provide the pressure sensing units and the touch units with the pressure-scanning pulses and the touch-scanning pulses. Hence, the duty cycles (operational periods) of the pressure-scanning pulses and the touch scanning pulses are shortened, and interferences of electrical signals between them are also reduced. The technology for interlacing the potential switching points according to the present embodiment is similarly suitable to other embodiments.

Figure 13:
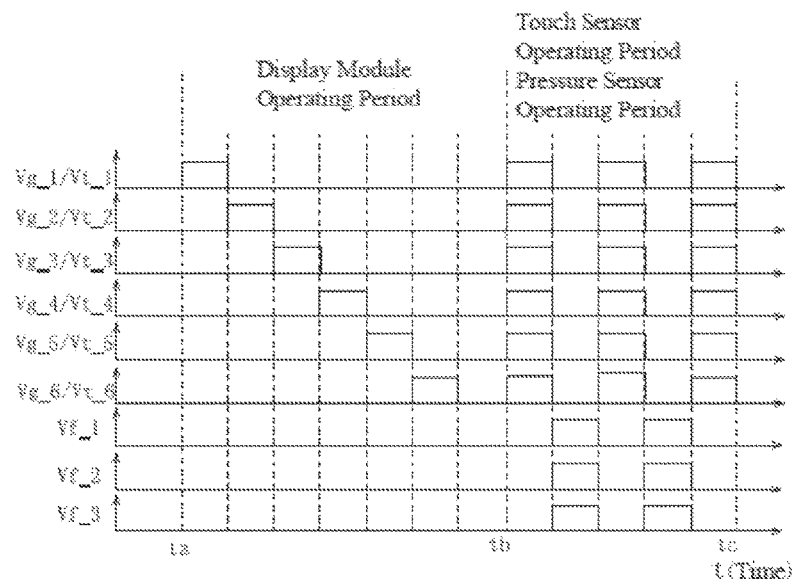
FIG. 13 depicts a time sequence diagram of touch-scanning pulses, pressure-scanning pulses, and gate-scanning pulses of a display device with a three-dimensional input module according to a seventh embodiment of this invention.

A description is provided with reference to FIG. 13. A display device with a three-dimensional input module (not numbered) is provided according to a seventh embodiment of this invention. The display device with the three-dimensional input module differs from the display devices with the three-dimensional input modules according to the first to the sixth embodiments only in that: the pixel units and the touch units share drive lines. During a period between ta and tb, common drive lines provide the plurality of pixel units with the gate-scanning pulses. During a period between tb and tc, the common drive lines provide the touch units with the touch-scanning pulses. The signal processing logic according to the present embodiment is preferably implemented by cooperating with an embedded touch display panel (such as an in-cell LCD, an on-cell LCD, or an on-cell AMOLED). Independent drive lines are disposed in the pressure sensor to receive the pressure-scanning pulses, which also operate during the period between tb and tc. However, the pressure-scanning pulses and the touch-scanning pulses are performed with different time sequence. In the present embodiment, utilizing the common drive lines can effectively decrease a number of the wires in the display device with the three-dimensional input module, which is advantageous for simplifying the circuit design and manufacturing process.

Figure 14:
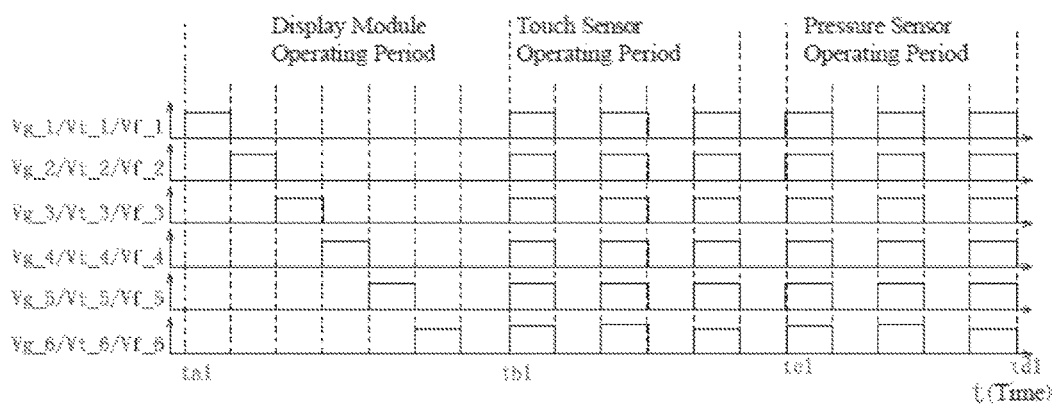
FIG. 14 depicts a time sequence diagram of touch-scanning pulses, pressure-scanning pulses, and gate-scanning pulses of a display device with a three-dimensional input module according to an eighth embodiment of this invention.

A description is provided with reference to FIG. 14. A display device with a three-dimensional input module (not numbered) is provided according to an eighth embodiment of this invention. The display device with the three-dimensional input module differs from the display devices with the three-dimensional input modules according to the first to the seventh embodiments only in that: the pixel units, the touch units, and the pressure sensing units share drive lines. Common drive lines sequentially provide the pixel units with the gate-scanning pulses during a period between ta1 and tb1, the touch units with the touch-scanning pulses during a period between tb1 and tc1, and the pressure-scanning pulses during a period between tc1 and td1. In the present embodiment, utilizing the common drive lines can effectively decrease the number of the wires in the display device with the three-dimensional input module, which is advantageous for simplifying the circuit design and manufacturing process. The signal processing logic according to the present embodiment is preferably implemented by cooperating with an embedded touch and force display panel (such as an in-cell type touch and force LCD, an on-cell type touch and force LCD, or an on-cell type touch and force AMOLED).

Figure 15:
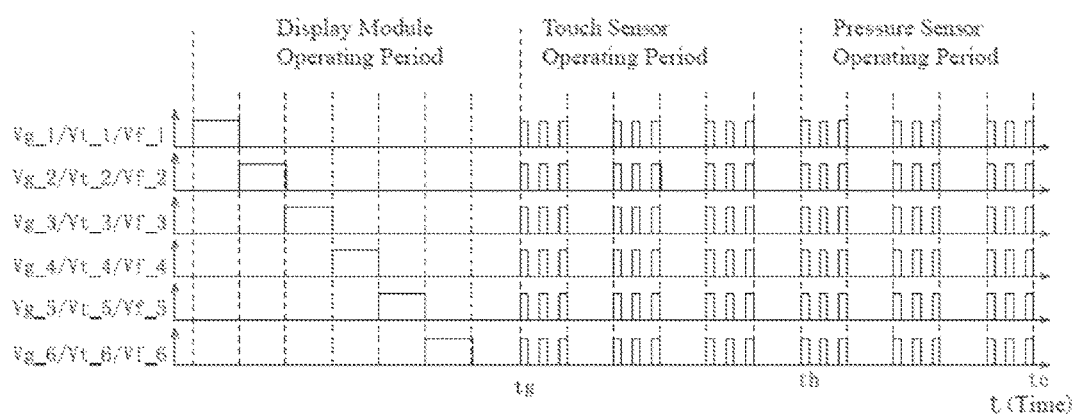
FIG. 15 depicts a time sequence diagram of touch-scanning pulses, pressure-scanning pulses, and gate-scanning pulses of a display device with a three-dimensional input module according to a ninth embodiment of this invention.

A description is provided with reference to FIG. 15. A display device with a three-dimensional input module (not numbered) is provided according to a ninth embodiment of this invention. The display device with the three-dimensional input module differs from the display devices with the three-dimensional input modules according to the first to the eighth embodiments only in that: each of the touch-scanning pulses and pressure-scanning pulses comprises a plurality of narrow pulses to improve noise immunities between signals. In the present embodiment, three narrow pulses are taken as an example for illustration. However, a number of the narrow pulses is not limited.

Figure 16A:
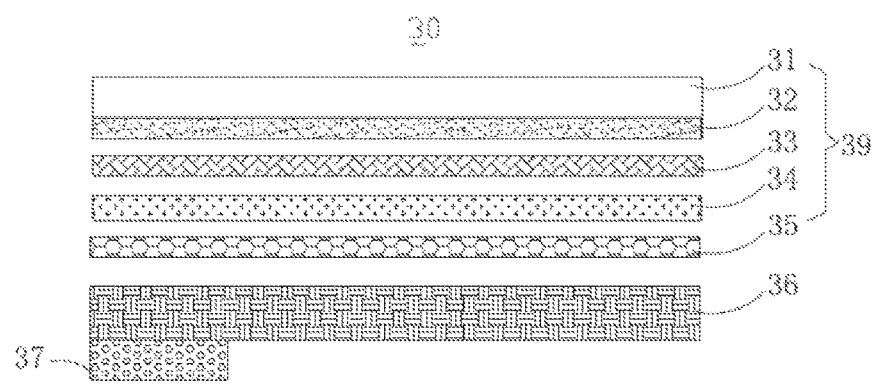
FIG. 16A depicts a schematic diagram of a layered structure of a display device with a three-dimensional input module according to a tenth embodiment of this invention.
Figure 16B:
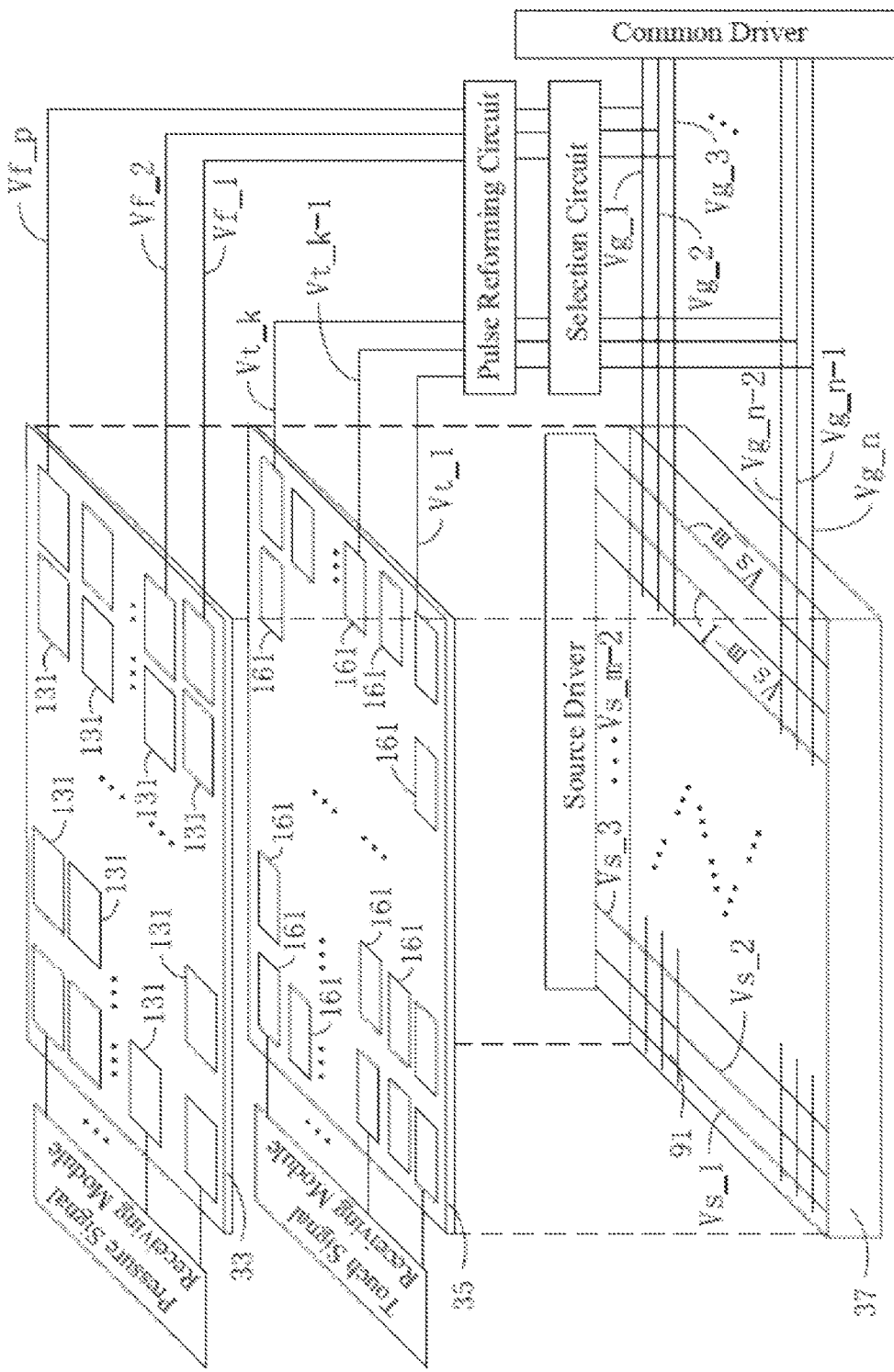
FIG. 16B depicts a schematic diagram of a three-dimensional structure of the display device with the three-dimensional input module according to the tenth embodiment of this invention.

A description is provided with reference to FIG. 16A and FIG. 16B. A display device with a three-dimensional input module 30 is provided according to a tenth embodiment of this invention. The display device with the three-dimensional input module 30 differs from the display devices with the three-dimensional input modules according to the first to the ninth embodiments only in that: a position of a touch sensor in the display device with the three-dimensional input module 30 is different. The display device with the three-dimensional input module 30 sequentially comprises an upper substrate 31, a bonding layer 32, a pressure layer 33, a substrate layer 34, a touch sensor 35, a display module 36, and a signal processing circuit 37 from top to bottom. The upper substrate 31, the bonding layer 32, the pressure layer 33 having pressure sensing units 131 disposed thereon, the substrate layer 34, and the touch sensor 35 having touch units 161 disposed thereon form a three-dimensional input module 39. The three-dimensional input module 39 is used for detecting press positions of multiple points and pressing force values of multiple points.

The substrate layer 34 serves as a bearing layer of the pressure layer 33. The pressure layer 33 is bonded to the upper substrate 31 through the bonding layer 32. The pressure layer 33, the touch sensor 35, and the display module 36 can be directly bonded conveniently according to the present embodiment so as to form the display device with the three-dimensional input module 30.

Figure 17:
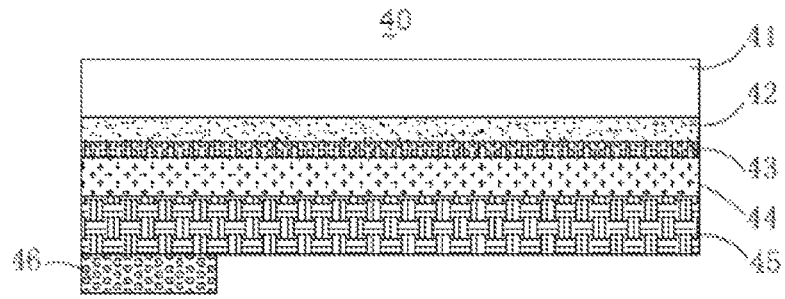
FIG. 17 depicts a schematic diagram of a layered structure of a display device with a three-dimensional input module according to an eleventh embodiment of this invention.

A description is provided with reference to FIG. 17. A display device with a three-dimensional input module 40 is provided according to an eleventh embodiment of this invention. The display device with the three-dimensional input module 40 differs from the display devices with the three-dimensional input modules according to the first to the tenth embodiments only in that: a position of a touch sensor in the display device with the three-dimensional input module 40 is different. A pressure sensor and the touch sensor (not numbered) in the display device with the three-dimensional input module 40 form an electrode layer 43. The electrode layer 43 is disposed on a substrate layer 44. In addition, the display device with the three-dimensional input module 40 comprises some other components, that is, an upper substrate 41, a bonding layer 42, and a display 45. The pressure sensor and the touch sensor are disposed on the same substrate layer 44 to significantly decrease a thickness of the display device with a three-dimensional input module 40. Most preferably, touch units and pressure sensing units are complementarily disposed to allow the display device with the three-dimensional input module to have a better display effect.

Figure 18A:
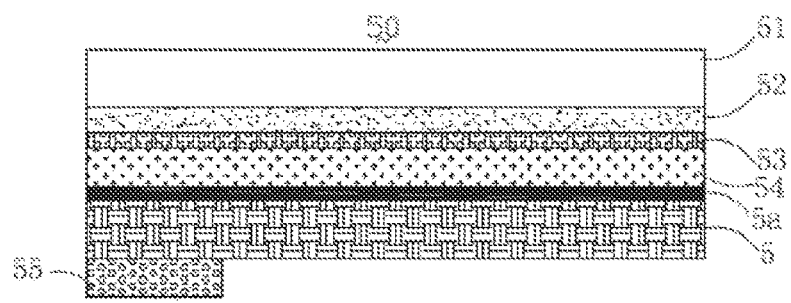
FIG. 18A depicts a schematic diagram of a layered structure of a display device with a three-dimensional input module according to a twelfth embodiment of this invention.

A description is provided with reference to FIG. 18A. A display device with a three-dimensional input module 50 is provided according to a twelfth embodiment of this invention. The display device with the three-dimensional input module 50 differs from the display devices with the three-dimensional input modules according to the first to the eleventh embodiments only in that: a shielding layer 5a is further disposed in the display device with the three-dimensional input module 50. The display device with the three-dimensional input module 50 sequentially comprises an upper substrate 51, a bonding layer 52, a pressure layer 53, a substrate layer 54, the shielding layer 5a, a display module having a position input function 5, and a signal processing circuit 55a from top to bottom. The shielding layer 5a is a meta layer, which can effectively reduce signal interferences between the display module having the position input function 5 and the pressure layer 53. In a preferred embodiment, in addition to being a metal layer, the shielding layer 5a may be selectively designed in a cutwork form to match the pixel units of the display module so as to increase the overall transmittance of the display device with the three-dimensional input module 50.

Figure 18B:
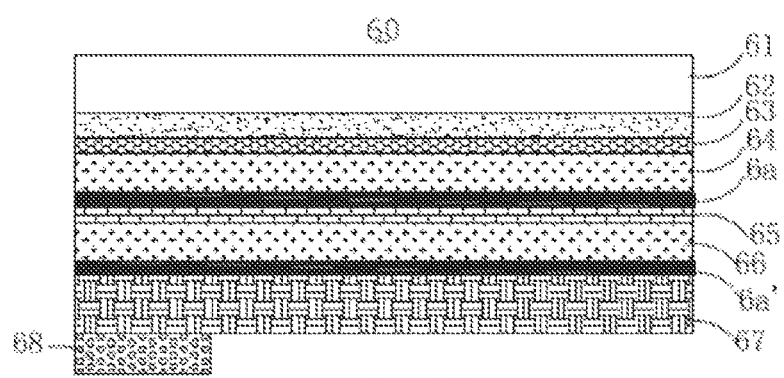
FIG. 18B depicts a schematic diagram of a layered structure of a display device with a three-dimensional input module according to a thirteenth embodiment of this invention.

A description is provided with reference to FIG. 18B. A display device with a three-dimensional input module 60 is provided according to a thirteenth embodiment of this invention. The display device with the three-dimensional input module 60 differs from the display devices with the three-dimensional input modules according to the first to the twelfth embodiments only in that: a pressure sensor 63 and the touch sensor 65 are respectively disposed on a first substrate layer 64 and a second substrate layer 66. A first shielding layer 6a is disposed between the pressure sensor 63 and the touch sensor 65. A second shielding layer 6a' is disposed between the touch sensor 65 and a display module 67. In this manner, the first shielding layer 6a and the second shielding layer 6a' can effectively reduce signal interferences among the pressure sensor 63, the touch sensor 65, and the display module 67. In fact, only one of the first shielding layer 6a and the second shielding layer 6a' may be selected to be disposed. Positions of the pressure sensor 63 and the touch sensor 65 can be exchanged.

Figure 19A:
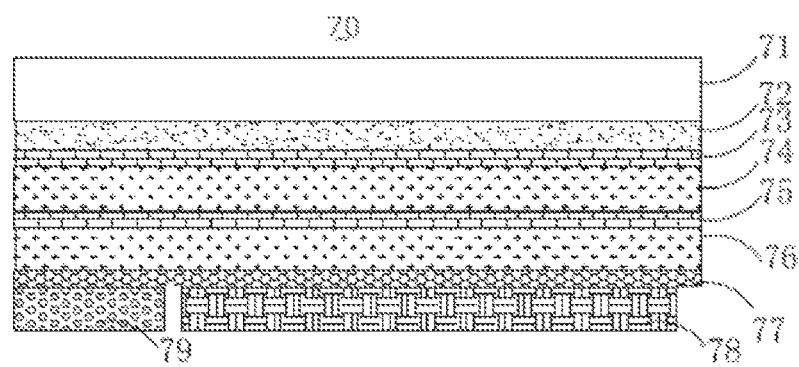
FIG. 19A depicts a schematic diagram of a layered structure of a display device with a three-dimensional input module according to a fourteenth embodiment of this invention.

A description is provided with reference to FIG. 19A. A display device with a three-dimensional input module 70 is provided according to a fourteenth embodiment of this invention. The display device with the three-dimensional input module 70 differs from the display devices with the three-dimensional input modules according to the first to the eighth embodiments only in that: a first pressure layer and a second pressure layer are disposed in the display device with the three-dimensional input module 70 according to the present embodiment. The display device with the three-dimensional input module 70 comprises an upper substrate 71, a bonding layer 72, a first pressure layer 73, a first substrate layer 74, a second pressure layer 75, a second substrate layer 76, a touch sensor 77, a display module 78, and a signal processing circuit 79 from top to bottom. The second pressure layer 75 is added according to the present embodiment. The pressing force value can thus be more accurately detected through the superposition of detection results of the two pressure layers. A number of at least one pressure sensing unit (not shown in the figure) disposed on the first pressure layer 73 and/or the second pressure layer 75 ranges from 10 to 100, and preferably ranges from 17 to 45.

The first substrate layer 74 and the second substrate layer 76 may be flexible substrates having different stress coefficients. Hence, the pressure sensing units disposed on the flexible substrates having different stress coefficients can have different signal sensing amounts to improve the sensitivity of pressure sensing.

Figure 19B:
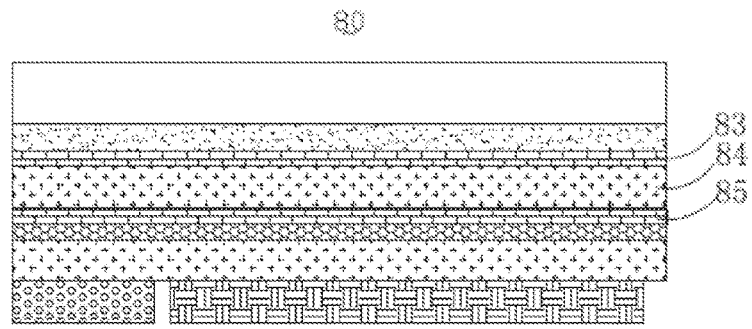
FIG. 19B depicts a schematic diagram of a transformed layered structure of the display device with the three-dimensional input module according to the fourteenth embodiment of this invention.

A description is provided with reference to FIG. 19B, which shows a transformed display device with a three-dimensional input module 80. A first pressure layer 83 and a second pressure layer 85 are respectively disposed on an upper surface and a lower surface of a same substrate layer 84.

Figure 20:
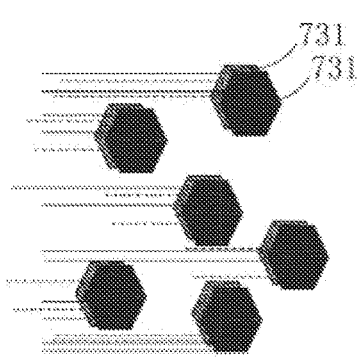
FIG. 20 depicts a schematic diagram showing a partial superposition effect of a first pressure layer and a second pressure layer in the display device with the three-dimensional input module according to the fourteenth embodiment of this invention.

A description is provided with reference to FIG. 19A and FIG. 20. An arrangement of pressure sensing units 731 located on the first pressure layer 73 preferably does not exactly correspond to and is misaligned with an arrangement of the pressure sensing units 730 located on the second pressure layer 75. A vertical projection area of each of the pressure sensing units 731 on the first pressure layer 73 on the pressure sensing unit 731 on the second pressure layer 75 corresponding to the each of the pressure sensing units 731 on the first pressure layer 73 is 10% to 90% of an area of a single pressure sensing unit 731, more preferably 50% to 80%.

Figure 21:
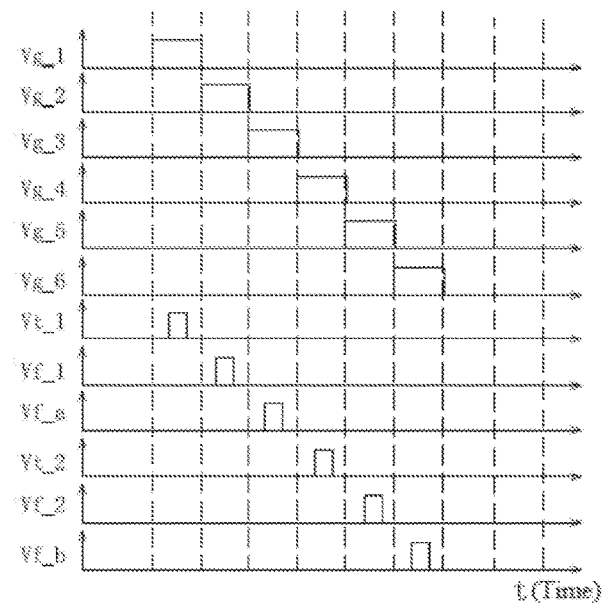
FIG. 21 depicts a time sequence diagram of touch-scanning pulses, pressure-scanning pulses, and gate-scanning pulses of the display device with the three-dimensional input module according to the fourteenth embodiment of this invention.

A description is provided with reference to FIG. 21, in which one group of pixel units, one group of touch units, and two groups of pressure sensing units are taken as an example to illustrate the touch-scanning pulses and the pressure-scanning pulses outputted from the driving pulse processing circuit (not shown in the figure). It is set that: $Vt\_1$ and $Vt\_2$ are the touch-scanning pulses respectively received by the touch unit 1 and the touch unit 2. $Vg\_1$ and $Vg\_2$ are the gate-scanning pulses respectively received by the pixel unit 1 and the pixel unit 2. $Vf\_1$ and $Vf\_2$ are the pressure-scanning pulses respectively received by the pressure sensing unit 1 and the pressure sensing unit 2 on the first pressure layer 73. Vf_a and Vf_b are pressure-scanning pulses respectively received by a pressure sensing unit a and a pressure sensing unit b on the second pressure layer 75. The touch-scanning pulses, the pressure-scanning pulses received by the pressure sensing units 731 on the first pressure layer 73, and the pressure-scanning pulses received by the pressure sensing units 731 on the second pressure layer 75 are performed with different time sequence, but they are performed according to the time sequence of the gate-scanning pulses. That is, the touch-scanning pulses, the pressure-scanning pulses received by the pressure sensing units 731 on the first pressure layer 73, and the pressure-scanning pulses received by the pressure sensing units 731 on the second pressure layer 75 are performed in different operating periods of the gate-scanning pulses. Pulse widths of the touch-scanning pulses, the pressure-scanning pulses received by the pressure sensing units 731 on the first pressure layer 73, and the pressure-scanning pulses received by the pressure sensing units 731 on the second pressure layer 75 are narrower to avoid potential switching points of one another so as to improve interference immunities between signals. Of course, the pulse widths may not be narrowed. Each of the pressure-scanning pulses or the touch-scanning pulses may comprise a plurality of short pulses to reduce the interferences between signals.

Figure 22:
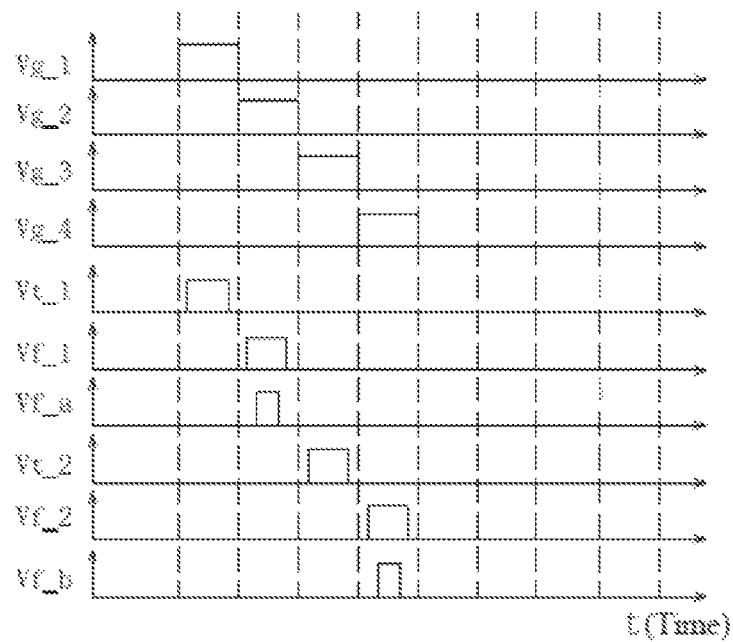
FIG. 22 depicts a time sequence diagram of touch-scanning pulses, pressure-scanning pulses, and gate-scanning pulses of a display device with a three-dimensional input module according to a fifteenth embodiment of this invention.

A description is provided with reference to FIG. 22. A display device with a three-dimensional input module (not numbered) is provided according to a fifteenth embodiment of this invention. The display device with the three-dimensional input module differs from the display device with the three-dimensional input module 70 according to the fourteenth embodiment only in that: the pulse width of the touch-scanning pulses is narrower and the touch-scanning pulses is performed according to the time sequence of the gate-scanning pulses. The pressure-scanning pulses received by the first pressure layer and the second pressure layer are performed according to the time sequence of the gate-scanning pulses, but are performed with different time sequence from the touch-scanning pulses. That is, the pressure-scanning pulses received by the first pressure layer and the second pressure layer and the touch-scanning pulses are performed in different operating periods of the gate-scanning pulses. The pulse width of the pressure-scanning pulses received by the first pressure layer is narrower than the pulse width of the pressure-scanning pulses received by the second pressure layer. The potential switching points of the gate-scanning pulses, the touch-scanning pulses, and the pressure-scanning pulses are interlaced. In this manner, interferences between signals are reduced. In practice, as long as the potential switching points of the scanning pulses received by the touch units, the first pressure layer, and the second pressure layer are interlaced, scanning pulse widths for the touch units, the first pressure layer, and the second pressure layer are not limited. One or more of the touch-scanning pulses, the pressure-scanning pulses received by the first pressure layer, and the pressure-scanning pulses received by the second pressure layer may be performed with same time sequence.

Figure 23:
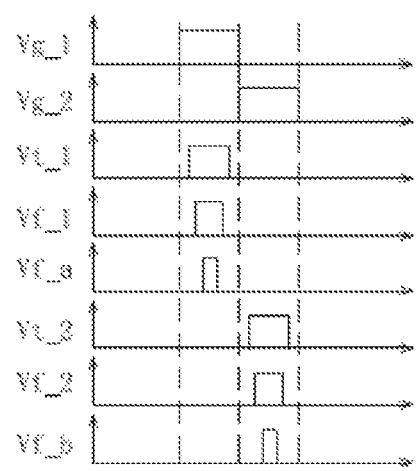
FIG. 23 depicts a time sequence diagram of touch-scanning pulses, pressure-scanning pulses, and gate-scanning pulses of a display device with a three-dimensional input module according to a sixteenth embodiment of this invention.

A description is provided with reference to FIG. 23. A display device with a three-dimensional input module (not numbered) is provided according to a sixteenth embodiment of this invention. The display device with the three-dimensional input module differs from the display device with the three-dimensional input module according to the fifteenth embodiment only in that: the pulse widths of the gate-scanning pulses, the touch-scanning pulses, the pressure-scanning pulses received by the first pressure layer, and the pressure-scanning pulses received by the second pressure layer become narrower sequentially. The gate-scanning pulses, the touch-scanning pulses, the pressure-scanning pulses received by the first pressure layer, and the pressure-scanning pulses received by the second pressure layer are performed with same time sequence. In addition, their duty cycles (operational periods) completely overlap but potential switching points of them are interlaced so as to avoid interferences between signals.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device with a three-dimensional input module, comprising:
    a pressure sensor comprising a plurality of pressure sensing units used for detecting pressing force values of multiple points in Z direction;
    a touch sensor having a plurality of touch units arranged in an array used for detecting press positions of multiple points in X direction and Y direction;
    a plurality of pixel units arranged in an array used for displaying; and
    a common controller generating pixel-scanning pulses for the plurality of pixel units, generating touch-scanning pulses for the touch sensor, and generating pressure-scanning pulses for the pressure sensor so as to obtain the press positions and the pressing force values corresponding to the multiple points;
    wherein an arranged density of the plurality of pixel units is greater than or equal to an arranged density of the plurality of touch units, and wherein the arranged density of the plurality of touch units is greater than or equal to an arranged density of the plurality of pressure sensing units.

2. The display device with the three-dimensional input module of claim 1, wherein the pressure sensor comprises a first pressure layer on which at least one pressure sensing unit is disposed and a second pressure layer on which at least one pressure sensing unit is disposed, the first pressure layer and the second pressure layer are disposed on at least one flexible substrate.

3. The display device with the three-dimensional input module of claim 2, wherein a number of the pressure sensing units disposed on the first pressure layer ranges from 10 to 100, a number of the pressure sensing units disposed on the second pressure layer ranges from 10 to 100.

4. The display device with the three-dimensional input module of claim 2, wherein an arrangement of the pressure sensing units disposed on the first pressure layer is misaligned with an arrangement of the pressure sensing units disposed on the second pressure layer.

5. The display device with the three-dimensional input module of claim 1, further comprising a display module disposed on one side of the pressure sensor, wherein the display module comprises the touch sensor and the plurality of pixel units.

6. The display device with the three-dimensional input module of claim 5, further comprising a shielding layer disposed between the pressure sensor and the display module.

7. The display device with the three-dimensional input module of claim 1, wherein the common controller comprises a driving pulse processing circuit and a common driver, the driving pulse processing circuit comprises a selection circuit and/or an pulse reforming circuit, the common driver, the selection circuit, and the pulse reforming circuit are electrically connected in sequence.

8. The display device with the three-dimensional input module of claim 7, wherein:
the common driver generates the pixel-scanning pulses to instruct the plurality of pixel units for updating displayed colors, and
the selection circuit and/or the pulse reforming circuit modulate the pixel-scanning pulses to generate the pressure-scanning pulses for controlling a time sequence of the plurality of pressure sensing units and to generate the touch-scanning pulses for controlling a time sequence of the plurality of touch units.

9. The display device with the three-dimensional input module of claim 8, wherein the selection circuit and/or the pulse reforming circuit modulate the pixel-scanning pulses to generate the pressure-scanning pulses having pulse widths and square wave amplitudes different from the pixel-scanning pulses.

10. The display device with the three-dimensional input module of claim 1, wherein the pixel-scanning pulses, the touch-scanning pulses, and the pressure-scanning pulses are performed in different operating periods, wherein the pixel-scanning pulses, the touch-scanning pulses, and the pressure-scanning pulses are alternately performed without time interval or are alternately performed with time intervals.

11. The display device with the three-dimensional input module of claim 1, wherein the common controller comprises a plurality of drive lines for providing the pixel-scanning pulses, the touch-scanning pulses, and the pressure-scanning pulses, at least two of the pressure sensing units, the pixel units, and the touch units share the drive lines.

12. The display device with the three-dimensional input module of claim 1, wherein the common controller comprises a plurality of drive lines for providing the pixel-scanning pulses, the drive lines sequentially provide the touch-scanning pulses and the pressure-scanning pulses after providing the pixel-scanning pulses.

13. The display device with the three-dimensional input module of claim 1, wherein each of the pressure-scanning pulses and/or the touch-scanning pulses comprises one or more narrow pulses.

14. The display device with the three-dimensional input module of claim 1, further comprising
a display module disposed on one side of the touch sensor, wherein the display module comprises the plurality of pixel units.

15. The display device with the three-dimensional input module of claim 14, further comprising a shielding layer disposed between the touch sensor and the display module.

16. The display device with the three-dimensional input module of claim 1, wherein the common controller further comprises a touch signal receiving module, a pressure signal receiving module and an integrated processor, wherein a pressure signal is transmitted to the pressure signal receiving module in the situation of detecting pressing force values, and a touch signal is transmitted to the touch signal receiving module in the situation of detecting press positions, and wherein the integrated processor calculates the pressure signal and the touch signal from the pressure signal receiving module and the touch signal receiving module to obtain the pressing force values and the press positions of the multiple points.

17. The display device with the three-dimensional input module of claim 16, further comprising a pressure signal processor, wherein the pressure signal is transmitted to the pressure signal receiving module through the pressure signal processor.

18. The display device with the three-dimensional input module of claim 17, wherein the plurality of pressure sensing units are electrically connected to the common controller and the pressure signal processor, and the plurality of touch units are electrically connected to the common controller.

19. The display device with the three-dimensional input module of claim 17, wherein the pressure signal processor comprises a bridge and a multiway multiplexer, wherein the bridge is electrically connected to the multiway multiplexer.

20. The display device with the three-dimensional input module of claim 19, wherein:
the bridge comprises at least one resistor Ra, at least one resistor Rb, and an operational amplifier circuit;
the multiway multiplexer comprises a first multiway multiplexer MUX1 and a second multiway multiplexer MUX2;
a plurality of input terminals of the first multiway multiplexer MUX1 are connected to the plurality of pressure sensing units of a first group of the pressure sensor, wherein a first plurality of internal resisters correspond to the plurality of pressure sensing units of the first group of the pressure sensor;
a plurality of input terminals of the second multiway multiplexer MUX2 are connected to the plurality of pressure sensing units of a second group of the pressure sensor, wherein a second plurality of internal resisters correspond to the plurality of pressure sensing units of the second group of the pressure sensor;
each of the second plurality of internal resisters is disposed adjacent to one of the first plurality of internal resisters and acts as a reference resistor to the adjacent one of the first plurality of internal resisters;
one end of each of the first plurality of internal resisters and the second plurality of internal resisters is connected to a negative terminal of a drive source;
an output terminal of the first multiway multiplexer MUX1 and an output terminal of the second multiway multiplexer MUX2 respectively serve as a non-inverting input terminal and an inverting input terminal of the operational amplifier circuit;
the at least one resistor Ra has one end to connect to the output terminal of the first multiway multiplexer MUX1 and has the other end to connect to a positive terminal of the drive source;
the at least one resistor Rb has one end to connect to the output terminal of the second multiway multiplexer MUX2 and has the other end to connect to the positive terminal of the drive source; and
one of the first plurality of internal resisters selected by the first multiway multiplexer MUX1, one of the second plurality of internal resisters selected by the second multiway multiplexer MUX2, the at least one resistor Ra and the at least one resistor Rb constitute a Wheatstone bridge;

wherein the pressure signal is transmitted to the integrated processor of the common controller under the circumstance that the Wheatstone bridge is in a broken equilibrium state.

* * * * *